(12) United States Patent
Lubert et al.

(10) Patent No.: US 9,235,306 B2
(45) Date of Patent: Jan. 12, 2016

(54) OPERATING AND DISPLAY DEVICE FOR A DOMESTIC APPLIANCE, AND DOMESTIC APPLIANCE

(75) Inventors: Thomas Lubert, Berlin (DE); Lothar Knopp, Berlin (DE); Thomas Ludenia, Falkensee (DE); Gino Wybranietz, Falkensee (DE); Dietmar Bruss, Wenzenbach (DE); Erich Schmid, Wenzenbach (DE); Peter Vogelsang, Regensburg (DE)

(73) Assignee: BSH HAUSGERAETE GMBH, Munich (DE)

( * ) Notice: Subject to any disclaimer, the term of this patent is extended or adjusted under 35 U.S.C. 154(b) by 65 days.

(21) Appl. No.: 14/128,203

(22) PCT Filed: Jun. 20, 2012

(86) PCT No.: PCT/EP2012/061759
§ 371 (c)(1),
(2), (4) Date: Mar. 12, 2014

(87) PCT Pub. No.: WO2012/175523
PCT Pub. Date: Dec. 27, 2012

(65) Prior Publication Data
US 2014/0192013 A1    Jul. 10, 2014

(30) Foreign Application Priority Data

Jun. 21, 2011   (DE) .......................... 10 2011 077 896

(51) Int. Cl.
*G06F 3/044* (2006.01)
*D06F 39/00* (2006.01)

(52) U.S. Cl.
CPC .............. *G06F 3/044* (2013.01); *D06F 39/005* (2013.01)

(58) Field of Classification Search
CPC combination set(s) only.
See application file for complete search history.

(56) References Cited

U.S. PATENT DOCUMENTS 4,121,204 A   10/1978  Welch et al.
4,204,204 A    5/1980  Pitstick
(Continued)

FOREIGN PATENT DOCUMENTS

DE       2824973 A1   12/1979
DE      10133135 A1    1/2003
(Continued)

OTHER PUBLICATIONS

German Search Report for corresponding German Application No. 10 2011 077 896.9, mailed Aug. 30, 2011, 5 pages.
(Continued)

*Primary Examiner* — Van Chow
(74) *Attorney, Agent, or Firm* — Laurence Greenberg; Werner Stemer; Ralph Locher

(57) ABSTRACT

The invention relates to an operating and display device (11) for a domestic appliance, comprising operating means for setting at least one parameter of an operating process of the domestic appliance, a light conductor part (24, 34) for conducting light, a plurality of function symbols (13, 14, 15), which each symbolize a respective selectable value of the parameter, and a lighting device (47) for backlighting the function symbols (13, 14, 15), by means of which lighting device the function symbol (13, 14, 15) associated with the presently selected value of the parameter can be optically distinguished from the other function symbols (13, 14, 15), wherein the operating means are designed as touch-sensitive operating means and have a touch-sensitive actuation surface (16), which is arranged such as to overlap with the function symbols (13, 14, 15) and thus the value of the parameter associated with one of the function symbols (13, 14, 15) can be selected by touching the actuation surface (16) in an overlap area (17) that overlaps with one of the function symbols (13, 14, 15).

14 Claims, 3 Drawing Sheets

(56) References Cited

U.S. PATENT DOCUMENTS

2007/0242055 A1  10/2007  Lai
2011/0302533 A1* 12/2011  Stuhr et al. .................. 715/825

FOREIGN PATENT DOCUMENTS

| DE | 10236718 A1 | 2/2004 |
|----|----|----|
| DE | 102006013937 A1 | 9/2007 |
| DE | 10 2007 06152 | 6/2009 |
| DE | 10 2009 01167 | 8/2010 |
| DE | 102009042244 A1 | 3/2011 |
| EP | 1273851 A2 | 1/2003 |
| GB | 2022872 | 12/1979 |
| GB | 2262820 | 6/1993 |
| WO | WO 2007/011280 A1 | 1/2007 |
| WO | WO 2007104433 A1 | 9/2007 |

OTHER PUBLICATIONS

International Search Report issued for PCT/EP2012/061759, mailed Dec. 4, 2012.
Foreign-language Written Opinion of the International Searching Authority for PCT/EP2012/061759, mailed Dec. 4, 2012.
International Preliminary Report on Patentability with 4 Amended Sheets for PCT/EP2012/061759, mailed Oct. 17, 2013.

* cited by examiner

English labels - as in Fig. 3

OPERATING AND DISPLAY DEVICE FOR A DOMESTIC APPLIANCE, AND DOMESTIC APPLIANCE

This application is the U.S. national phase of International Application No. PCT/EP2012/061759, filed 20 Jun. 2012, which designated the U.S. and claims priority to DE Application No. 10 2011 077 896.9, filed 21 Jun. 2011, the entire contents of each of which are hereby incorporated by reference.

The invention relates to an operating and display device for a domestic appliance. The operating and display device comprises operating means for setting at least one parameter of an operational process of the domestic appliance. It also comprises a light conductor part for conducting light, wherein a plurality of function symbols are included, which each symbolize a respective selectable value of the parameter. The operating and display device also comprises a lighting device for backlighting the function symbols, by means of which the function symbol assigned to the respective selected value of the parameter can be optically distinguished from the other function symbols. The invention also relates to a domestic appliance with such an operating and display device.

Such operating and display devices already exist as the prior art. In this context, FIG. 1 shows a known operating and display device 1 from the applicant's home. This operating and display device 1 is mounted on an operating panel of a washing machine. It comprises an LED display 2 with a plurality of function symbols, each of which symbolizes a different value of a parameter of the washing machine. And three groups of function symbols are actually provided, namely a first column of function symbols 3 which each represent a different value of an operating temperature, a second column of function symbols 4, which each represent a different value of a speed of the washing drum, and also a third column of function symbols 5 which each symbolize an additional function. The following functions can be selected as additional functions: "Rapid", "Less ironing", "Extra water", "Extra rinse", "Intensive" and "Pre-wash". Below the LED display 2 there are operating elements 6, 7, 8 which are capacitive switches. The operating elements 6, 7, 8 are used to set the parameters. And indeed the value for the temperature can be selected with the operating elements 6, the desired value for the speed with the operating elements 7 and also one or more additional functions with the operating elements 8. In order to facilitate the assignment of the operating elements 6, 7, 8 to the respective parameters, the operating elements 6, 7, 8 are arranged directly below the respective columns of function symbols 3, 4, 5. The person operating the machine can for example tap on the operating element 6 several times in order to select the desired value for the temperature. As well as the operating elements 6, 7, 8, there is also an additional capacitive operating element 9 by means of which the desired time until a washing process finishes can be set. This set time is then shown in a display area 10 of the LED display 2.

Thus an LED display with an assigned operating device is of interest here. With such displays lighting elements—LEDs—are used, by means of which the display symbols or function symbols can be backlit. Such an operating and display device is also known for example from document DE 102 36 718 A1. This operating and display device contains an operating panel which is a one-piece plastic injection-molded part, which is made of ABS plastic. The operating panel has a circular backlighting area in which the material thickness of the panel material is reduced in relation to the normal material thickness such that the backlighting area is permeable to light. This backlighting area forms an optical display device—display symbols or function symbols are attached to the surface of the backlighting area, which can be lit by means of a lighting element—such as an LED for example. The lighting element is attached to a printed circuit board. Furthermore a sensor electrode is attached to the rear side of the operating panel which is an element of a capacitive switch or an element of a touch capacitor. The sensor electrode is connected electrically via a coupling element or contact part to the printed circuit board and thus to an evaluation unit. The coupling element can be embodied elastically, as a metallic helical spring or leaf spring for example or as a compressible element made of conductive, elastic plastic. The printed circuit board is thus at a distance from the operating panel. The sensor electrode surrounds the backlighting area, however the function and display symbols do not cover the sensor electrode. The disadvantage of this prior art is to be seen as the fact that the coupling element causes a degree of crosstalk between the sensor electrode and any other sensor electrodes or other capacitive switches which might be present. The actuation of one of the capacitive switches can thus cause a function assigned to another capacitive switch to be inadvertently triggered.

Publication DE 28 24 973 A1 discloses an operating and display device for a domestic appliance. A two-row display provided with labels and symbols is mounted on a printed circuit board which is connected via a ribbon cable to the other control elements of the domestic appliance. The display is covered by an operating panel or control panel which is provided with transparent metallic surfaces. These metallic surfaces, with the surfaces lying below them, form a capacitive switching element which is used for command activation. The display is for example equipped with lighting elements in LED or LCD technology.

Document US 2007/0242055 A1 discloses a touch-sensitive OLED display (OLED stands for Organic Light Emitting Diode). This display contains a substrate or a circuit board, an OLED device and also a capacitive operating device as well is a seal. The capacitive operating device comprises a first transparent and conductive layer, an insulating layer and also a second transparent and conductive layer, which are attached to the rear side of a cover or panel. The circuit board is disposed at a distance from the panel. Arranged on the circuit board is an OLED device which can likewise consist of three different layers. A space between the panel and the circuit board is sealed by means of the seal.

An operating and display device for a washing machine is also disclosed in GB 2 262 820 A.

A further operating and display device with an operating panel for a domestic appliance is also disclosed in DE 10 2006 013 937 A1. This device has a switching arrangement which is coupled to actuation and display segments arranged on the outside of the operating panel and which is arranged in the area of the inner side of the operating panel. The switch arrangement comprises at least three electrodes, which are arranged roughly in parallel to the operating panel, wherein the spatial position of an actuation segment in relation to the position of the electrodes is determined by means of an evaluation means. This enables the positions of the actuation segments in the area of the outer side of the operating panel to be freely defined. Such an operating and display device thus needs expensive evaluation means in order to establish the location of the actuation and assign it to a segment, so that this segment can also act as an operating means for setting a parameter. Furthermore such a device must have calibration devices so that the location of the actuation can be correctly established, in order to avoid an incorrect allocation of the actuation segment.

The object of the invention is to demonstrate a way in which, for an operating and display device of the generic type described above, the operation or the setting of the parameter respectively can be simplified and provided by simple means when compared to the prior art.

This object is achieved in accordance with the invention by an operating and display device with the features as claimed, and also by a domestic appliance with the features as claimed. Advantageous embodiments of the invention are the subject matter of the dependent claims, the description and the figures.

An inventive operating and display device for a domestic appliance contains operating means for setting at least one parameter of an operational process of the domestic appliance. A light conductor part serves to conduct light. The device further comprises function symbols which each symbolize or represent a selectable value of the parameter and optically identify the operating means. The function symbols can be backlit with a lighting device, by means of which the function symbol assigned to the respective selected value of the parameter can be optically distinguished from other function symbols. The operating means are embodied as touch-sensitive operating means and have a touch-sensitive actuation surface which is arranged so as to overlap with the function symbols such that, when the actuation surface in an overlapping area with one of the function symbols is touched, the value of the parameter assigned to this function symbol is selected.

Thus a touch-sensitive display is created in accordance with the invention in which the display symbols or function symbols can be tapped on directly in order to set the parameter of the operational process of the domestic appliance. The person operating the machine can thus, to all intents and purposes, touch the function symbols directly in order to select the desired parameter value. On the one hand this facilitates the operation of the domestic appliance or the setting of the parameter when compared to the prior art in accordance with FIG. 1, since an operating element no longer needs to be actuated. On the other hand the display itself can be enlarged compared to the prior art, since the operating elements next to the display are no longer needed. In addition the invention makes an intuitive and user-friendly operation of the domestic appliance possible. The person operating the machine can namely touch or tap on the touch-sensitive actuation surface directly at the point of the selected function symbol and the parameter value assigned to this function symbol will immediately be selected.

The inventive operating and display device thus represents a touch-sensitive display, in particular an LED display, in which the value of the parameter is selected by tapping on one of the function symbols and the selection of this function symbol can be signaled by backlighting this symbol. The operating device is thus operated by touching the actuation surface without any mechanical movement of an operating knob having to be undertaken. This means in particular that operating panels in which such operating devices are used can be embodied with a closed surface without a breakthrough, which for domestic appliances in particular has the advantage that no contamination can get inside the machine and in addition the closed surface can be cleaned especially easily.

A domestic appliance is understood here as an appliance which is used for housekeeping purposes. The domestic appliance is thus an appliance which is embodied for handling domestic items, such as items of washing and/or crockery and/or food and the like. It can be a large domestic appliance such as a washing machine, a washer/dryer, a dishwasher, an oven, an extractor hood, a refrigeration device, a fridge-freezer combination or an air conditioning device. It can however also be a small domestic appliance such as a coffee maker or a kitchen machine.

It proves especially advantageous if the operating means for setting the parameter are embodied as capacitive operating means. They can have a plurality of capacitive sensor electrodes or electrically-conductive sensor surfaces which are arranged at a distance from and overlapping with the touch-sensitive actuation surface. Tapping the function symbol is thus detected by capacitive means. If the actuation surface is touched by the operator, the capacitance of a touch capacitor, which is formed on one side by one of the sensor electrodes and on the other side by the operator's finger, changes. This change in the capacitance can then be detected by an evaluation unit or evaluation electronics and interpreted as actuation. Such capacitive switches have the advantage that touching the actuation surface can be detected especially reliably and quickly, without the operating panel having to be embodied with a breakthrough.

In respect of the actuation of the actuation surface there is provision, in accordance with the invention, for at least a part of the function symbols—if necessary all function symbols—to be able to be assigned a separate capacitive sensor electrode, which is arranged so as to overlap with the function symbol assigned to it. Touching the actuation surface in an overlapping area with one of the sensor electrodes thus changes the capacitance of the touch capacitor featuring this sensor electrode. Each function symbol can thus be tapped on separately or independently of other function symbols and the desired value of the parameter can be selected by simple touching of the actuation surface in the overlapping area with the respective function symbol or the assigned sensor electrode.

In addition a second embodiment can also be included, in accordance with which a capacitive slider switch can also be provided. At least two adjacent function symbols can be arranged overlapping with a common capacitive sensor electrode. The desired value of the parameter can then be selected by sliding the finger over the actuation surface in an overlapping area with the at least two function symbols and the common sensor electrode. In this embodiment the person operating the machine can move their finger on the touch-sensitive actuation surface and bring it into the desired end position above the desired function symbol. If the finger is moved for example from a first of the function symbols to a second function symbol, the highlighting of the first function symbol is extinguished and the second function symbol is activated. It is also possible here to simply tap on one of the function symbols, without performing a sliding movement with the finger.

Preferably the function symbols which can be backlit by means of the lighting device, namely especially via the light conductor part, are attached to the light conductor part. The function symbols each symbolize a different value of the parameter of the operational process of the domestic appliance. As well as a number or a digit—such as a temperature value or speed value—a value of the parameter can also be understood here as labels or sequences of letters, namely for example different operating programs of the domestic appliance and/or different additional functions. A parameter can for example also be an operating program of the domestic appliance—the designation of the actual operating program can be understood here as the parameter value. Equally an additional function of the domestic appliance can be set as a parameter, with a washing machine for example "Less ironing" or "Pre-wash". The function symbols can generally comprise letters and/or numbers and/or picture labels and/or pictures or pictorial symbols and/or combination symbols, such as word-picture symbols for example.

Thus the operating means can be embodied for setting at least one of the following parameters of the operational process: They can be embodied for setting an operating temperature as a parameter—at least one part of the function symbol can symbolize or represent a selectable value of the operating temperature in each case. This embodiment proves especially advantageous in a domestic appliance for laundry care—such as a washing machine—also in a dishwasher or in a domestic appliance for food preparation—such as an oven or a cooktop. The person operating the appliance can tap in the desired temperature value on the touch-sensitive actuation surface in order to set this temperature value.

In addition or as an alternative the operating means can also be embodied for setting a speed of movement, especially a rotational speed of a component of the domestic appliance, as a parameter. Here at least a part of the function symbols can symbolize or represent a selectable value of the movement speed (rotational speed) in each case. This form of embodiment is especially sensible with those domestic appliances which have movable components, such as a washing drum or the like for example.

In addition or as an alternative the operating means can be embodied for defining an operating program for the operational process as a parameter and at least some of the function symbols can symbolize in each case a different operating program or a different designation of an actual operating program. This applies correspondingly to additional functions of the domestic appliance. Thus each of the function symbols can identify a different additional function of the domestic appliance.

A thin film with the function symbols can be attached to the light conductor part. This can be a label film or a light mask. This enables the function symbols and the actuation surface to be embodied in a wide variety of ways and this can be done independently of the embodiment of the light conductor part. This means that for different country variants only different label films have to be used in each case, while the other components can be retained.

In respect of the mechanical embodiment of the operating and display device generally a very wide variety of embodiments can be provided. Thus in one embodiment the surface of the light conductor part or of the label film attached to it can form the touch-sensitive actuation surface. In this embodiment the said capacitive sensor electrodes can be arranged on a rear side of the light conductor part.

As an alternative there can be provision for a plate-like display window or display disk embodied at least in part, especially completely, from a light-permeable material to be attached to the light conductor part. This display window can be made of transparent plastic. The surface of the display window can simultaneously form the touch-sensitive actuation surface. This display window can be inserted into a through-opening of a control panel of the domestic appliance, it can be welded into the control panel for example. The use of a separate display window, the surface of which simultaneously forms the touch-sensitive actuation surface, has the advantage that on the one hand the film with the function symbols can be protected against outside influences and on the other hand the outer surface of the operating and display device can also be designed optically attractively in a wide diversity of ways, and this can be done independently of the light conductor part and the film with the function symbols attached to it. Thus for example the different device variants can be provided in each case with different display windows, for example each with a different color tint.

On a rear side of the display window facing away from the actuation surface, with the exception of the areas overlapping with the function symbols or also in the overlapping area with the function symbols—an at least partly non-light permeable print mask, especially a screen print, can be attached. A print mask is understood as a layer which is embodied to reduce the passage of light or prevent it completely, wherein the effect can be restricted to specific light wavelengths, for example only to light of a specific color, or only to light passing through in one direction. Thus for example conductor tracks which are arranged behind the display window, on a flexible film for example, can be hidden. If a print mask reducing the passage of light is also provided in the overlapping area with the function symbols, non-lit function symbols can also not be seen from the surface (actuation side) of the display window, i.e. when the display window of the operating device with such a print mask is used as intended, a function symbol can only be seen by a person operating the machine on the surface of the display window facing towards them when the backlighting assigned to the function symbol is activated.

The display window can be embodied from a color-tinted material. This is a way of preventing the print mask attached to the rear side of the display window from being seen on the operating side of the operating and display device.

A transparent film with the sensor electrodes—and if necessary with conductor tracks—can be arranged on the light conductor part or on the display window, especially between the light conductor part and the display window. These sensor electrodes and the conductor tracks can for example be attached individually to the transparent foil by hot stamping or by another manufacturing process. The conductor tracks can be coupled via contact surfaces (contact pads)—made of carbon for example—to the electronics of the domestic appliance. The contacting with the electronics can be undertaken via spring elements made of conductive material which are held in plastic retainers for example. Thus the transparent film with the capacitive sensor electrodes can be arranged between the display window and the light conductor part. Such an arrangement of the sensor electrodes has the advantage that the distance between the touch-sensitive actuation surface (surface of the display window) on the one hand and the sensor electrodes on the other hand is especially small and the sensitivity of the operating device is thus especially high.

The film can also be a multilayer film. If such a multilayer film is inserted between the display window and the light conductor part, the print mask on the rear side of the display window may not be necessary.

As an alternative to the multilayer film a decor film can be sprayed onto the front of a transparent plastic display and the conductor track film can be attached to the rear side of the transparent plastic display. The conductor track film can be connected by gluing or by what is known as an IML or IMD technology to the plastic display. IML stands for In-Mold-Labeling, which is also understood as an injection molding method. IMD stands for In-Mold-Decoration and refers to an injection molding or hot stamping method.

As an alternative to the transparent film a printed circuit board can be arranged on a rear side of the light conductor part facing away from the actuation surface, to which the capacitive sensor electrodes are attached. This can appear such that the sensor electrodes are in contact with the rear side of the light conductor part. Such a solution is especially cost-effective since it does away with the use of transparent film with transparent sensor electrodes. On the other hand the arrangement of the sensor electrodes directly on the rear side of the light conductor part ensures that no air gap is formed between the actuation surface on the one side and the sensor electrodes on the other side, which could adversely affect the sensitivity of the capacitive operating device.

The lighting device can comprise a plurality of lighting elements—such as LEDs—which are used for backlighting the function symbols. The lighting elements can be arranged on a rear side of the circuit board facing away from the light conductor part. The following embodiments are then provided: On the one hand through-openings can be embodied in the circuit board through which the light of the lighting elements can be conducted. On the other hand the circuit board itself can be embodied at least in some areas transparent or translucent, so that the light of the lighting elements is conveyed via the transparent area. On the one hand there is thus more space available on the other side of the circuit board for the sensor electrodes and if necessary also for conductor tracks. On the other hand the advantage achieved by this is that no air gap is formed between the circuit board on the one side and the light conductor part on the other side or the circuit board can rest against the rear side of the light conductor part over its full area. An air gap between the light conductor part and the sensor electrodes is thus prevented, as is the reduction of the sensitivity of the capacitive operating device.

An inventive domestic appliance comprises an inventive operating and display device, wherein the preferred embodiments presented in relation to the inventive operating and display device and their advantages apply equally to the inventive domestic appliance.

Further features of the invention emerge from the claims, the figures and the figure description. All features and combinations of features specified in the description as well as the features and feature combinations specified subsequently in the figure description or shown in the figures alone are able to be used not only in the respective specified combination but also in other combinations or on their own.

The invention will now be explained in greater detail on the basis of individual preferred exemplary embodiments, and also with reference to the enclosed drawings.

Figure 1:
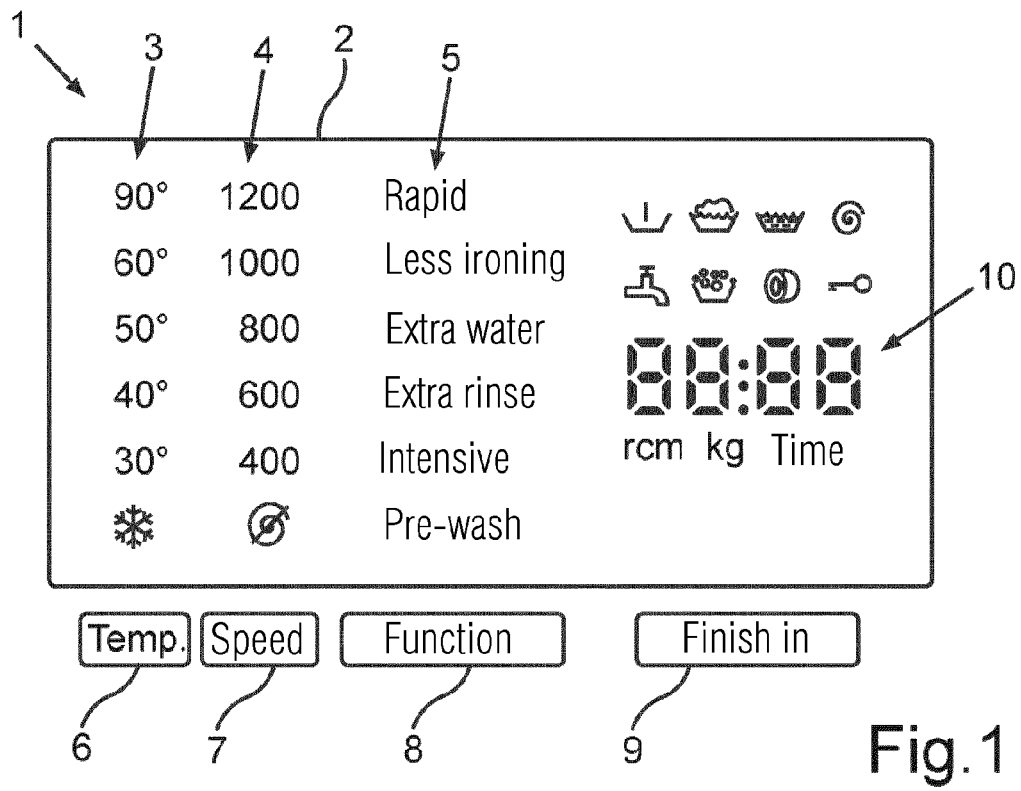
FIG. 1 shows a schematic diagram of an operating and display device in accordance with the prior art.
Figure 2:
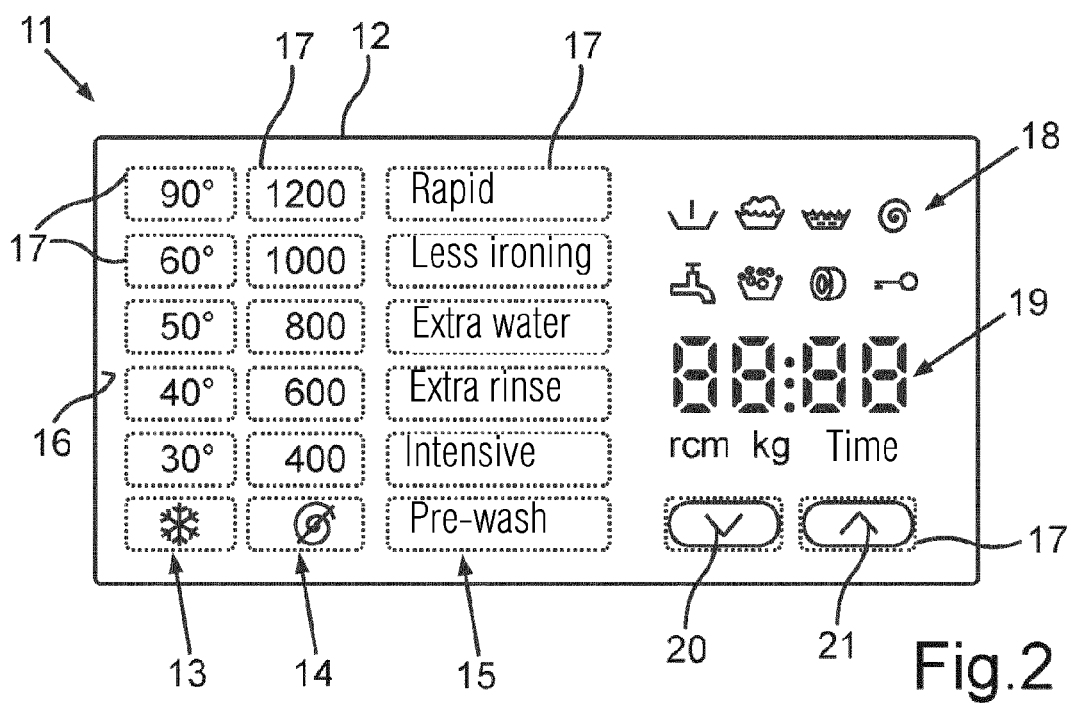
FIG. 2 shows an operating and display device in accordance with a first embodiment of the invention.

FIG. 2 shows a schematic diagram of an operating and display device 11 of a washing machine in accordance with an embodiment of the invention. The operating and display device 11 contains a touch-sensitive LED display 12 which has a plurality of function symbols which can be backlit. As in FIG. 1—three columns of function symbols are provided, namely a first column of function symbols 13, a second column of function symbols 14 and also the third column of function symbols 15. The first column of function symbols 13 symbolizes in each case a different value for an operating temperature of the washing machine. The function symbols 13 thus represent parameter values for the parameter "operating temperature". The second column of function symbols 14 each symbolize a different value for a rotational speed of the washing drum for spin operation of the washing machine. The function symbols 14 thus represent parameter values for the parameter "speed". The third column of function symbols 15 contains a plurality of different labels for additional functions of the washing machine. These are "Rapid", "Less ironing", "Extra water", "Extra rinse", "Intensive" and "Prewash".

The touch-sensitive LED display 12 has a touch-sensitive actuation surface 16, which can be touched by the person operating the machine in order to set the said parameters. Arranged behind the actuation surface 16 are a plurality of capacitive sensor electrodes, and in the exemplary embodiment in accordance with FIG. 2 there is a separate sensor electrode for each function symbol. Overlapping areas 17 are thus present between the sensor electrodes on the one side and the assigned function symbols on the other side, which are indicated in FIG. 2 by dashed lines, but are not visible however to the person operating the machine. The actuation surface 16 can be tapped on by the person operating the machine, and this can be done in the respective overlapping areas 17. Thus a function symbol 13, 14, 15 can be tapped on to select the desired parameter value.

The touch-sensitive LED-display 12 represents operating means within the meaning of the present invention which serve to set the said parameters.

Further symbols 18, which symbolize different phases of a washing process, are also present on the right-hand side of the rectangular LED display 12. These symbols 18 can be backlit by means of individual LEDs.

Located below the symbols 18 is a display area 19 with four seven-segment displays, which serve to display the time until a washing process finishes. This period of time can also be set by touching the touch-sensitive actuation surface 16, and this can be done in overlapping areas 17 with two symbols 20, 21. By tapping on the symbol 20 this period of time can be reduced, by tapping on the symbol 21 it can be increased.

If one of the parameter values is selected or one of the function symbols 13, 14, 15 is tapped on, then the selected function symbol is highlighted optically, namely in relation to other non-selected function symbols. This is done with the aid of a lighting device with a plurality of LEDs which are arranged behind the actuation surface 16.

Figure 3:
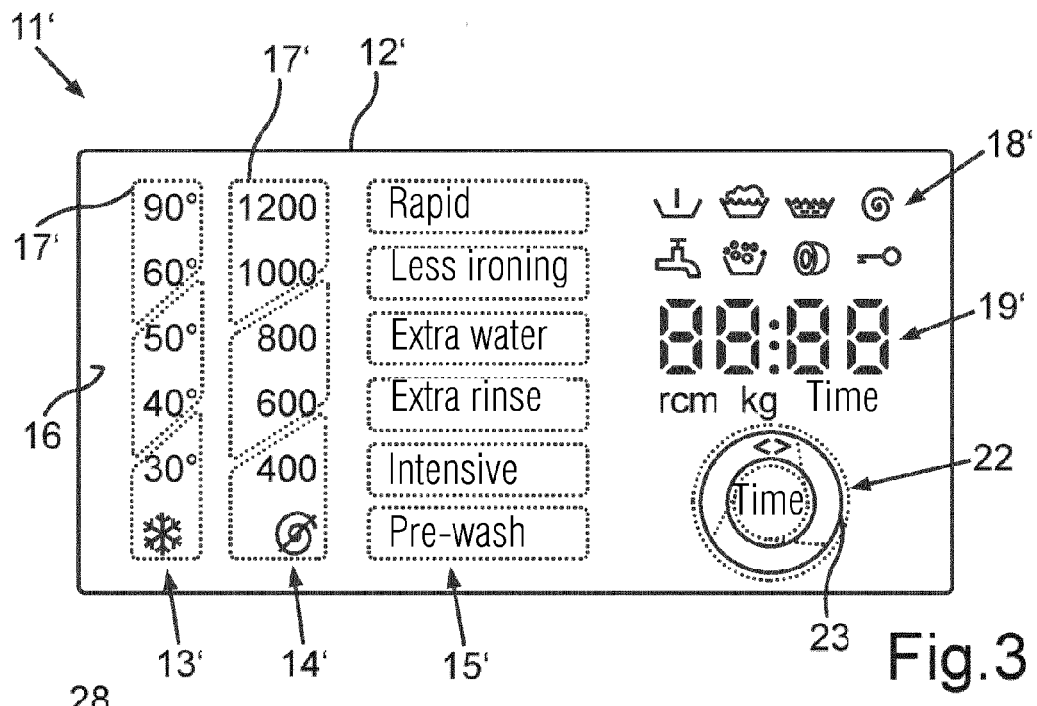
FIG. 3 shows an operating and display device in accordance with a second embodiment of the invention.

FIG. 3 shows an operating and display device 11' of a washing machine in accordance with the second embodiment of the invention. This operating and display device 11' in accordance with FIG. 3 essentially corresponds to the device in accordance with FIG. 2, so that only the differences between the two will be explained in greater detail below: While, with the operating and display device 11 in accordance with FIG. 2, each function symbol 13, 14, 15 is assigned a separate sensor electrode and thus separate overlapping areas 17 are present in each case, the function symbols 13', 14' for the operating and display device 11' in accordance with FIG. 3 are grouped in pairs, so that two adjacent function symbols 13', 14' of the same column are arranged to cover a common sensor electrode. This is shown by the dashed lines. This enables the respective parameter values to also be selected by sliding a finger over the actuation surface 16', wherein simple tapping on the function symbols 13', 14' is likewise possible. The time until the washing process finishes is also set in another way, namely with the aid of a circular capacitive slider switch 22. This slider switch 22 contains sensor electrodes in the form of circle segments, which are arranged behind the actuation surface 16. A symbol 23 is present on the LED display 12' which is in form of a circle. By sliding the finger along the symbol 23 in the clockwise direction, the said period of time can be increased, by sliding it in the counterclockwise direction this period of time is decreased.

Figure 4:
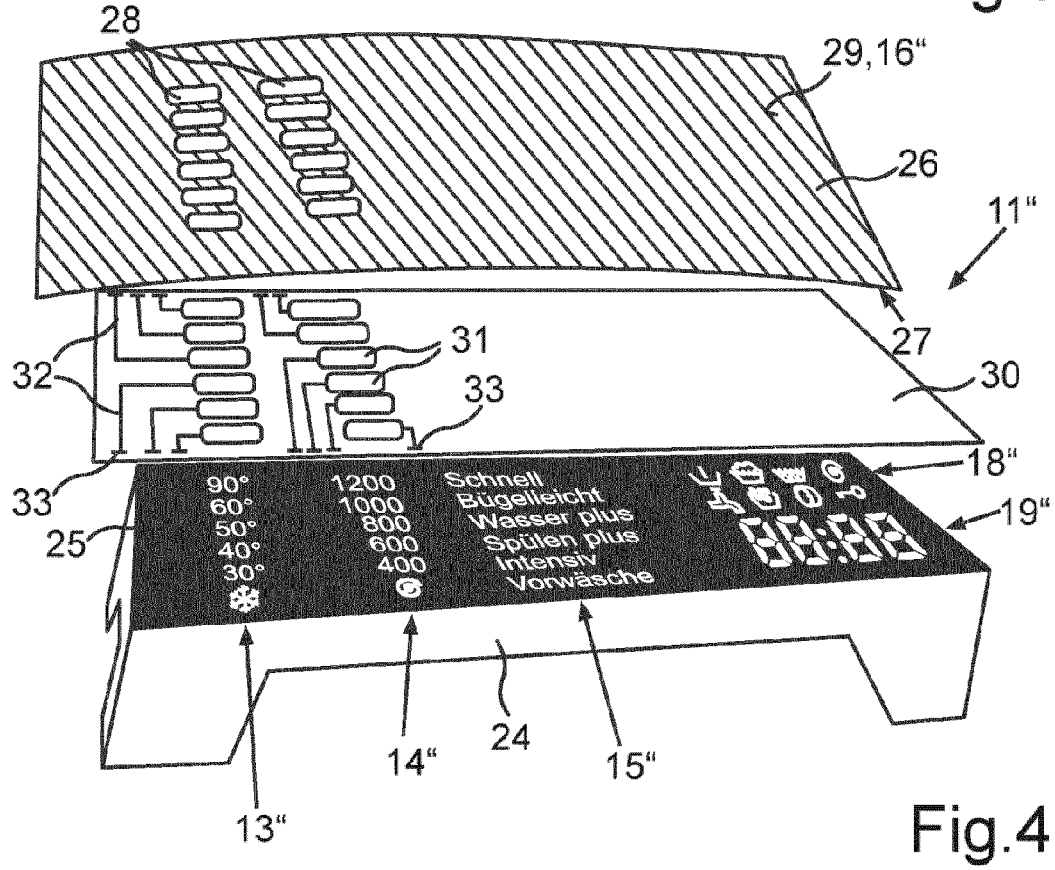
FIG. 4 shows a schematic diagram of a possible embodiment of the operating and display devices in accordance with FIGS. 2 and 3.
Figure 5:
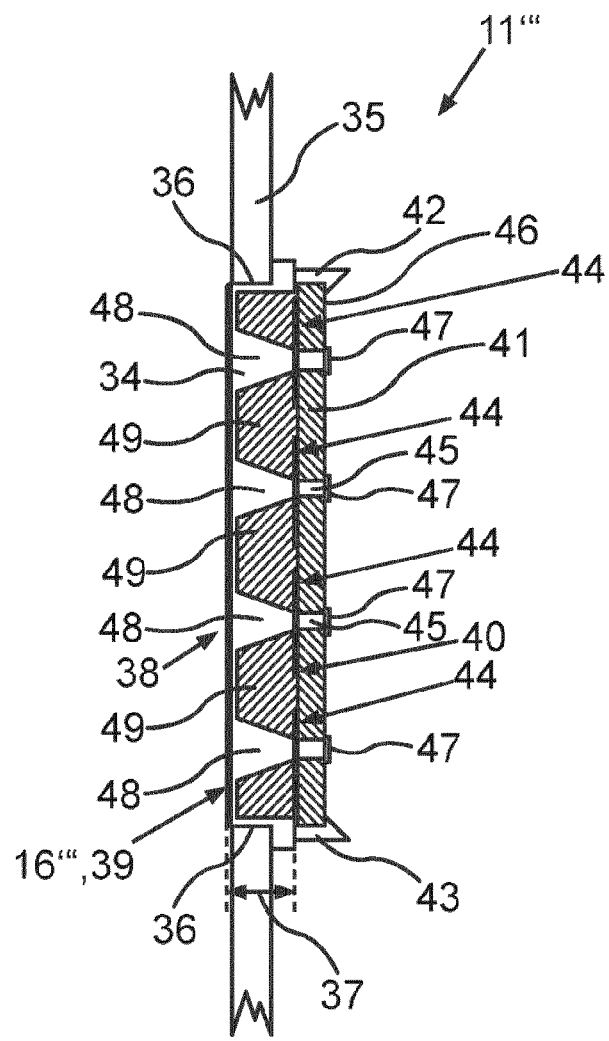
FIG. 5 shows a schematic diagram of an alternative embodiment of the operating and display devices.

Two different possible designs of the operating and display device are shown in FIGS. 4 and 5.

The capacitive operating and display device 11" shown in FIG. 4 contains a light conductor part 24, which serves to conduct light. A film 25 is attached to an end face side of the light conductor part 24, which is a label film or a light mask. Provided on the film 25 are the function symbols 13", 14", 15", and also the further symbols 18" as well as the display area 19". The light conductor part 24 is embodied from transparent plastic for example and is thus permeable to light. The film 25 on the other hand—with the exception of the function symbols 13", 14", 15" and the symbols 18" as well as the display area 19"—is impermeable to light. Thus the function symbols 13", 14", 15" can be backlit from the rear side of the light conductor part 24.

The operating and display device 11" also contains a display window 26, which is a plate-type, inherently rigid element. The display window 26 can be embodied entirely from a transparent material—for example from transparent plastic. This display window 26 is provided on a rear side 27 with a print mask, especially with screen printing. Not printed are surfaces 28, which lie directly above the function symbols 13", 14", 15" or cover these function symbols. For reasons of clarity only two columns of non-printed surfaces 28 are shown in FIG. 4; naturally such surfaces can also be present in the area of the symbols 18" and the display device 19". The non-printed surfaces 28 ensure that the function symbols 13", 14", 15" are visible from outside. An outer surface 29 of the display window 26 simultaneously forms the touch-sensitive actuation surface 16" of the operating and display device 11".

In a version of the operating and display device 11" not shown in any greater detail the surfaces 28 which lie directly above the function symbols 13", 14", 15" or which overlap these function symbols or the symbols 18" are provided on the rear side 27 of the display window 26 with print mask which reduces the passage of light. This means that a function symbol 13", 14", 15" or a symbol 18" is only visible to a person operating the machine on the surface 29 of the display window 26 facing towards them when the backlighting assigned to the function symbol 13", 14", 15" or the symbol 18" is activated.

So that the print mask is not visible from outside, the display window 26 can be embodied with a color tint. The display window 26 can be welded into an operating panel of the washing machine.

A transparent film 30 makes a material fit with the material of the rear side 27 of the display window 26. This film 30 is a flexible, single or multilayer design, completely or partly light-permeable conductive pattern film made of plastic, which is connected to the display window 26 in an injection molding or injection stamping process (IML/IMD) or by gluing. Sensor electrodes 31—likewise transparent—are arranged on the film 30 which are connected electrically via conductor tracks 32 in each case to contact surfaces 33. The conductor track layout can be individually attached to the film 30 beforehand by a hot stamping process or another process. The contact surfaces 33 can be made of carbon or another conductive material and likewise attached to the film 30. Contact with electronics of the washing machine is established via spring elements (not shown) made of conductive material, which are held in plastic retainers.

FIG. 5 shows a further possible embodiment of the invention. The operating and display device 11''' shown in FIG. 5 likewise contains a light conductor part 34 which is embodied for conducting light. The operating and display device 11''' contains an operating panel 35, which is embodied from plastic for example. Embodied in the operating panel 35 is a through-cutout 36 which is a passage opening. The light conductor part 34 which is plate-like, flat and for example rectangular or circular component, is inserted into the passage opening 36. A thickness 37 of the light conductor part 34 can amount to 6 mm for example. The light conductor part 34 is embodied from a dielectric and electrically-insulating material.

The light conductor part 34 extends in principle in parallel to the operating panel 35 and does so between the respective edges of the cutout 36. The light conductor part 34 is embodied in one piece and has an operating side 38 to which a thin label film 39 (light mask) is attached. The label film 39 can have a thickness of a few micrometers like the label film 25 in accordance with FIG. 4. Attached to or embodied on the label film 39 are the function symbols not shown in FIG. 5.

A printed circuit board or circuit board 41 is attached to a rear side 40 of the light conductor part 34, which is attached between two retainers 42, 43 of the light conductor part 34. A plurality of sensor electrodes 44 are attached to the printed circuit board 41 which rest against the rear side 40 of the light conductor part 34. The sensor electrodes 44 are thus located directly between the circuit board 41 and the light conductor part 34. A through-opening 45, which is covered in each case from a rear side 46 with a light emitting diode 47, is embodied for each sensor electrode 44 in the printed circuit board 41 in each case. The light emitting diodes 47 are lighting elements which serve to light the function symbols on the label film 39. The light emitting diodes 47 are thus located on the rear side 46 of the printed circuit board 41, and the light emitted by the light emitting diodes 47 is conducted through the respective through-opening 45 as well as via through-openings embodied in the sensor electrodes 44 (not shown) and then via the light conductor part 34 through to the label film 39.

In order to guarantee separate lighting of different function symbols independently of one another, the light conductor part 34 embodied in one piece consists of alternately arranged light-permeable segments 48 and light-impermeable segments 49 arranged between the said segments. Both the light-permeable segments 48 and also the light-impermeable segments 49 are embodied trapezeoidal in cross-section, namely such that the light-permeable segments 48 taper in the direction towards the respective through-opening 45. The light-permeable segments 48 thus begin at the respective through-opening 45 and have a width which becomes greater in a direction towards the label film 39. Thus the light-impermeable segments 49 are embodied narrowed in the direction towards the label film 39. The minimum width of the light-permeable segments 48 is roughly equal to the diameter of the through-openings 45. The maximum width of the light-permeable segments 48 depends on the size of the respective function symbol to be lit. Through such an embodiment of the light conductor part 34 relatively large display surfaces can be lit and this can be done with a large sensor electrodes 44 at the same time and thus with high sensitivity of the operating and display device at the same time.

These sensor electrodes 44 are electrically coupled to an evaluation unit or control device not shown in FIG. 5—this applies correspondingly to the sensor electrodes 31 in accordance with FIG. 4. Each sensor electrode in itself is a part of a touch capacitor, of which the second capacitor plate is formed by the finger of the person operating the device. In the exemplary embodiment in accordance with FIG. 5 the actuation surface 16''' is formed by the surface of the film 39. The person operating the machine can touch the actuation surface 16", 16''' in order to set the desired parameter value. The capacitance of the touch capacitor, which consists on one side of the finger of the person and on the other side of the sensor electrode 44, 31 lying opposite it, and also of the dielectricum lying therebetween, then changes. This capacitance change is then detected and evaluated by the evaluation unit. Such a method is for example already described in publication DE 10 2005 041 113 A1.

LIST OF REFERENCE CHARACTERS

1 Operating and display device
2 LED display
3 First column of function symbols
4 Second column of function symbols
5 Third column of function symbols
6, 7, 8, 9 Capacitive operating elements
10 Display area
11', 11", 11—Operating and display device
12' LED display
13', 13" First column of function symbols
14', 14" Second column of function symbols
15', 15" Third column of function symbols
16', 16", 16''' Touch-sensitive actuation surface
17' Overlapping areas
18', 18" Symbols
19', 19" Display area
21 Symbols
22 Switch
23 Symbol
24 Light conductor part
25 Film
26 Display window
27 Rear side
28 Non-printed areas
29 Surface
30 Film
31 Sensor electrodes
32 Conductor tracks
33 Contact surfaces
34 Light conductor part
35 Operating panel
36 Cutout
37 Thickness
38 Operating side
39 Label film
40 Rear side
31 Printed circuit board
42, 43 Retainers
44 Sensor electrodes
45 Through-opening
46 Rear side
47 Light emitting diode
48 Light-permeable segments
49 Light-impermeable segments

The invention claimed is:

1. An operating and display device for a domestic appliance, with:
an operating device for setting at least one parameter of an operating process of the domestic appliance, wherein the operating device includes a capacitive operating device and a touch-sensitive actuation surface,
a plurality of capacitive sensor electrodes, which are arranged at a distance from the touch-sensitive actuation surface,
a light conductor part for conducting light,
a plurality of function symbols, which each symbolize a selectable value of the parameter, and
a lighting device for backlighting the function symbols, by means of which the function symbol assigned to the respective value of the parameter can be optically distinguished from the other function symbols,
wherein the touch-sensitive actuation surface is arranged so as to overlap with the function symbols so that, by touching the actuation surface in an overlapping area with one of the function symbols, the value of the parameter assigned to this function symbol is able to be selected, and wherein a transparent layer with sensor electrodes attached thereto is arranged on the light conductor part or on the display window, wherein
the transparent layer is a film which is arranged between the light conductor part or on the display window, and
the capacitive sensor electrodes are arranged so as to overlap with the touch-sensitive actuation surface and a separate capacitive sensor electrode, which is arranged so as to overlap with the function symbols assigned to it, is assigned to at least a part of the function symbols in each case, so that by touching the actuation surface in an overlapping area with one of the sensor electrodes a capacitance of a touch capacitor having one of these sensor electrodes is able to be changed,
a plate-like display window, embodied at least in some areas from a light-permeable material, especially from transparent plastic, the surface of which forming the touch-sensitive actuation surface, being attached to the light conductor part, and except for in the overlapping areas with the function symbols, a light-impermeable printed mask, especially a screen print, being applied to a rear side of the display window facing away from the actuation surface.

2. The operating and display device as claimed in claim 1, wherein the film includes conductor tracks.

3. The operating and display device as claimed in claim 1, wherein the sensor electrodes and the conductor tracks are applied to the film by hot stamping.

4. The operating and display device as claimed in claim 1, wherein the function symbols are arranged on the light conductor part.

5. The operating and display device as claimed in claim 1, wherein at least two adjacent function symbols are arranged so as to overlap with a common sensor electrode, wherein by sliding over the actuation surface in an overlapping area with the at least two function symbols and the common sensor electrode, the respective assigned value of the parameter is able to be selected.

6. The operating and display device as claimed in claim 1, wherein the operating device is configured to set an operating temperature as a parameter and at least a part of the function symbols symbolizes a selectable value of the operating temperature in each case.

7. The operating and display device as claimed in claim 1, wherein the operating device is configured to set a speed of movement, of a component of the domestic appliance as the parameter and at least a part of the function symbols symbolizes a selectable value of the speed of movement in each case.

8. The operating and display device as claimed in claim 1, wherein the operating device is configured to define an operating program for the operating process as the parameter and at least a part of the function symbols symbolizes a different operating program in each case.

9. The operating and display device as claimed in claim 1, wherein a film with the function symbols is attached to the light conductor part.

10. An operating and display device for a domestic appliance, with:
an operating device for setting at least one parameter of an operating process of the domestic appliance, wherein the operating device includes a capacitive operating device and a touch-sensitive actuation surface, a plurality of capacitive sensor electrodes, which are arranged at a distance from the touch-sensitive actuation surface, a light conductor part for conducting light, a plurality of function symbols, which each symbolize a selectable value of the parameter, and a lighting device for backlighting the function symbols, by means of which the function symbol assigned to the respective value of the parameter can be optically distinguished from the other function symbols, wherein the touch-sensitive actuation surface is arranged so as to overlap with the function symbols so that, by touching the actuation surface in an overlapping area with one of the function symbols, the value of the parameter assigned to this function symbol is able to be selected, and wherein a transparent layer with sensor electrodes attached thereto is arranged on the light conductor part or on the display window, wherein the transparent layer is a film which is arranged between the light conductor part or on the display window, and the capacitive sensor electrodes are arranged so as to overlap with the touch-sensitive actuation surface and a separate capacitive sensor electrode, which is arranged so as to overlap with the function symbols assigned to it, is assigned to at least a part of the function symbols in each case, so that by touching the actuation surface in an overlapping area with one of the sensor electrodes a capacitance of a touch capacitor having one of these sensor electrodes is able to be changed, a plate-like display window, embodied at least in some areas from a light-permeable material, especially from transparent plastic, the surface of which forming the touch-sensitive actuation surface, being attached to the light conductor part, a printed mask, especially a screen print, is applied to a rear side of the display window facing away from the actuation surface in the overlapping area with the function symbols, which reduces the passage of light, wherein the function symbols are only visible on the surface of the display window when the backlighting is activated.

11. An operating and display device for a domestic appliance, with:

an operating device for setting at least one parameter of an operating process of the domestic appliance, wherein the operating device includes a capacitive operating device and a touch-sensitive actuation surface, a plurality of capacitive sensor electrodes, which are arranged at a distance from the touch-sensitive actuation surface, a light conductor part for conducting light, a plurality of function symbols, which each symbolize a selectable value of the parameter, and a lighting device for backlighting the function symbols, by means of which the function symbol assigned to the respective value of the parameter can be optically distinguished from the other function symbols, wherein the touch-sensitive actuation surface is arranged so as to overlap with the function symbols so that, by touching the actuation surface in an overlapping area with one of the function symbols, the value of the parameter assigned to this function symbol is able to be selected, and wherein a transparent layer with sensor electrodes attached thereto is arranged on the light conductor part or on the display window, wherein the transparent layer is a film which is arranged between the light conductor part or on the display window, and the capacitive sensor electrodes are arranged so as to overlap with the touch-sensitive actuation surface and a separate capacitive sensor electrode, which is arranged so as to overlap with the function symbols assigned to it, is assigned to at least a part of the function symbols in each case, so that by touching the actuation surface in an overlapping area with one of the sensor electrodes a capacitance of a touch capacitor having one of these sensor electrodes is able to be changed, a plate-like display window, embodied at least in some areas from a light-permeable material, especially from transparent plastic, the surface of which forming the touch-sensitive actuation surface, being attached to the light conductor part, the display window being formed from a color-tinted material.

12. An operating and display device for a domestic appliance, with:

an operating device for setting at least one parameter of an operating process of the domestic appliance, wherein the operating device includes a capacitive operating device and a touch-sensitive actuation surface, a plurality of capacitive sensor electrodes, which are arranged at a distance from the touch-sensitive actuation surface, a light conductor part for conducting light, a plurality of function symbols, which each symbolize a selectable value of the parameter, and a lighting device for backlighting the function symbols, by means of which the function symbol assigned to the respective value of the parameter can be optically distinguished from the other function symbols, wherein the touch-sensitive actuation surface is arranged so as to overlap with the function symbols so that, by touching the actuation surface in an overlapping area with one of the function symbols, the value of the parameter assigned to this function symbol is able to be selected, and wherein a transparent layer with sensor electrodes attached thereto is arranged on the light conductor part or on the display window, wherein the transparent layer is a film which is arranged between the light conductor part or on the display window, and the capacitive sensor electrodes are arranged so as to overlap with the touch-sensitive actuation surface and a separate capacitive sensor electrode, which is arranged so as to overlap with the function symbols assigned to it, is assigned to at least a part of the function symbols in each case, so that by touching the actuation surface in an overlapping area with one of the sensor electrodes a capacitance of a touch capacitor having one of these sensor electrodes is able to be changed, a plate-like display window, embodied at least in some areas from a light-permeable material, especially from transparent plastic, the surface of which forming the touch-sensitive actuation surface, being attached to the light conductor part, the display window being a transparent plastic display and on the rear side of the display window the film being connected to the display window by gluing or by an injection molding or hot stamping method.

13. An operating and display device for a domestic appliance, with:

an operating device for setting at least one parameter of an operating process of the domestic appliance, wherein the operating device includes a capacitive operating device and a touch-sensitive actuation surface, a plurality of capacitive sensor electrodes, which are arranged at a distance from the touch-sensitive actuation surface, a light conductor part for conducting light, a plurality of function symbols, which each symbolize a selectable value of the parameter, and a lighting device for backlighting the function symbols, by means of which the function symbol assigned to the respective value of the parameter can be optically distinguished from the other function symbols, wherein the touch-sensitive actuation surface is arranged so as to overlap with the function symbols so that, by touching the actuation surface in an overlapping area with one of the function symbols, the value of the parameter assigned to this function symbol is able to be selected, and wherein a transparent layer with sensor electrodes attached thereto is arranged on the light conductor part or on the display window, wherein the transparent layer is a film which is arranged between the light conductor part or on the display window, and the capacitive sensor electrodes are arranged so as to overlap with the touch-sensitive actuation surface and a separate capacitive sensor electrode, which is arranged so as to overlap with the function symbols assigned to it, is assigned to at least a part of the function symbols in each case, so that by touching the actuation surface in an overlapping area with one of the sensor electrodes a capacitance of a touch capacitor having one of these sensor electrodes is able to be changed, lighting elements of the lighting device being arranged on a rear side of the printed circuit board facing away from the light conductor part and:

through-openings being embodied in the printed circuit board through which the light of the lighting elements is able to be conveyed, and/or the printed circuit board being embodied transparent or translucent at least in some areas, so that the light is able to be conveyed via the transparent or translucent area.

14. A domestic appliance with an operating and display device as claimed in claim 1.

* * * * *